June 6, 1939.  S. C. AIKENHEAD  2,160,806

STORAGE BATTERY VENTING MEANS

Filed June 8, 1937

INVENTOR.
STEWART C. AIKENHEAD
BY Kwis Hudson & Kent
ATTORNEYS

Patented June 6, 1939

2,160,806

UNITED STATES PATENT OFFICE 2,160,806

STORAGE BATTERY VENTING MEANS

Stewart C. Aikenhead, Euclid, Ohio, assignor to Willard Storage Battery Company, Cleveland, Ohio, a corporation of West Virginia Application June 8, 1937, Serial No. 147,076

4 Claims. (Cl. 136—177)

This invention relates to storage batteries, and has for its principal object to provide an improvement over the usual venting means of such a nature that the battery can be vented and leakage of electrolyte prevented when the battery is placed on any of its sides in substantially horizontal position.

The invention may be used in batteries employed for a variety of different purposes, but finds especial utility in batteries placed in buoys which are required to be serviced from time to time, in which event the buoy cylinder is lifted from the water and placed in a boat or on a pier. In either event, the battery may be in a horizontal position for a considerable period of time, and with the ordinary venting means the level of the electrolyte would be above the vent opening for the cell, with the result that there would be a loss of electrolyte, with the possibility of an accumulation of evolved gases under sufficient pressure to damage the battery. In accordance with the present invention, the vent plug has a vent tube attached to its inner side with provision whereby the inner end of the tube is always maintained above the level of the electrolyte regardless of whether the battery is in upright position or in horizontal position.

The invention may be briefly summarized as consisting in certain novel details of construction and combinations and arrangements of parts which will be described in the specification and set out in the appended claims.

In the accompanying sheet of drawings.

Figure 1:
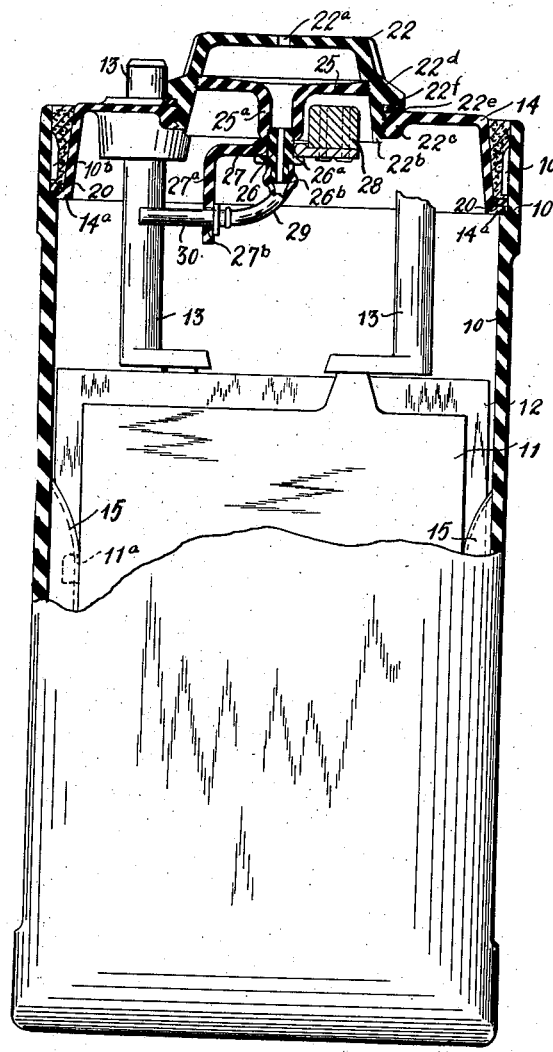
Fig. 1 is a view, partly in elevation and partly in vertical section, of a battery embodying the present invention.

Referring now to the drawing, 10 represents the case of the battery which may have one or any number of cells, but in this instance a single cell. Each cell, regardless of the number, will be provided with the present invention. In the cell are located the usual electrolyte, the positive and negative plates 11, and separators 12, the plates being provided as usual with terminal posts 13 which extend up through and are sealed in the cover 14. The manner of supporting the plates and the separators in the cell compartment, the manner of sealing the posts in the cover 14, and the manner of supporting and sealing the cover in the upper part of the cell compartment are all immaterial to the present invention and will therefore be only briefly referred to. In this instance, the case 10 is provided on its inner walls with ribs 15. The separators extend between these ribs and the plates are provided on their upright edges with lugs 11a which overlap the ribs so that the plates and the separators are held from lateral movement, substantially as in the Dunzweiler et al. Patent No. 2,042,515, granted January 2, 1936.

The cover has the usual skirt with a laterally extending flange 14a which rests on a shoulder 10a of the case 10. Guide ribs 10b are on the inner walls of the container above the shoulder, and the flange 14a has notches (not shown) to permit the cover to be lowered onto the shoulder 10a. Between the flange 14a of the cover and the lower ends of the ribs 10b on each wall of the case is a retainer 20, which may be in the form of a hard rubber strip which is notched to slip over the ribs 10b until it rests on the shoulder 10a, after which it is moved laterally slightly until the notches therein are out of line with the ribs 10b. It will then serve to prevent upward movement of the cover by pressure within the cell. This form of cover lock is not claimed herein but is more fully described and claimed in a companion application Serial No. 162,497, filed September 4, 1937.

The cover 14 has a filling opening closed by a filler plug 21, and it is provided also with a centrally located vent plug body 22 with a vent opening 22a at the top. The vent plug body 22 has on its lower side a threaded flange 22b which is screwed into an appropriately threaded flange 22c of the cover, and intermediate its ends it has an outer laterally projecting flange 22d which is adapted to engage a short upstanding flange 22e of the cover. A suitable gasket 22f is placed inside the flange 22e to form a seal to avoid leakage of the electrolyte.

Intermediate the upper and lower ends of the vent plug body there is provided a transverse partition 25 which may be formed separately from the body 22 and is preferably in the form of a disk screwed in place. This disk is provided with a central opening surrounded by a depending flange 25a which is threaded internally, and screwed into it is a nut 26 with a vent passageway extending from end to end therethrough. This nut is provided with a laterally extending flange 26a and at its lower end has a reduced extension 26b.

Swivelly supported on this nut is an arm 27 having a horizontal portion with an opening loosely receiving the nut, the adjoining portion of the arm being seated upon the flange 26a of the nut. Likewise, this arm is provided at one end with a depending portion which is disposed vertically or at right angles to the upper portion of the arm, the vertical portion 27a of the arm having near its lower end an opening 27b. Mounted on and secured to the upper horizontal part of the arm on the side thereof opposite that having the depending part 27a is a weight 28 which, as the arm 27 swivels on the nut, is adapted to swing freely in the annular downwardly facing channel formed between the flange 22b of the vent plug body and the flange 25a of the disk 25.

Fitted onto the reduced extension 26b at the lower end of the nut 26 is a flexible tube 29 of rubber or equivalent material which extends downwardly from the lower end of the nut and laterally and has its lower lateral end fitted onto a stem or nozzle 30 which projects freely through the opening 27b near the lower vertical parts 27a of the arm 27. This stem or nozzle, which normally extends in a horizontal direction, has a venting passageway extending therethrough which communicates with the passageway through the tube 29 and the opening through the nut 26, and with the chamber formed between the top of the vent plug body 22 and the disk 25 so that the evolved gases are normally vented through the stem, the tube, the nut, and the body 22. The case 10, the cover 14, and all the parts of the vent plug construction are formed of suitable materials unaffected by acid. The case 10 and the cover 14 may be formed of the usual materials, such as hard rubber. The vent plug body 22, the disk 25, the nut 26, the arm 27, and the stem 30 are preferably formed of hard rubber, the tube 29 of soft rubber, and the counterweight 28 of lead.

When the battery is in an upright position, the level of the electrolyte is well below the stem 30 so that the battery is vented through the stem 30, the tube 29, and the nut 26, and into the chamber above the disk 25 and out through the vent opening 22a. If the battery is turned on its side, the weight 28 immediately swings to its lowermost position, thus turning the arm 27 so as to swing the stem 30 upwardly. There is considerable unoccupied space between the normal electrolyte level and the cover so that when the battery is turned on its side the level of the electrolyte will be below the upper end of the vertically projecting stem 30.

Figure 2:
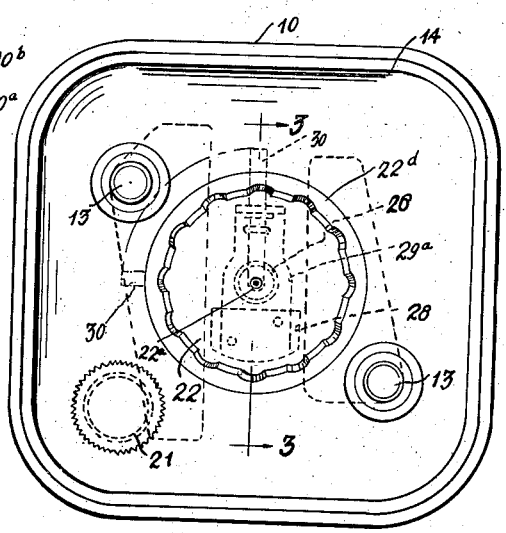
Fig. 2 is a top view of the same.
Figure 3:
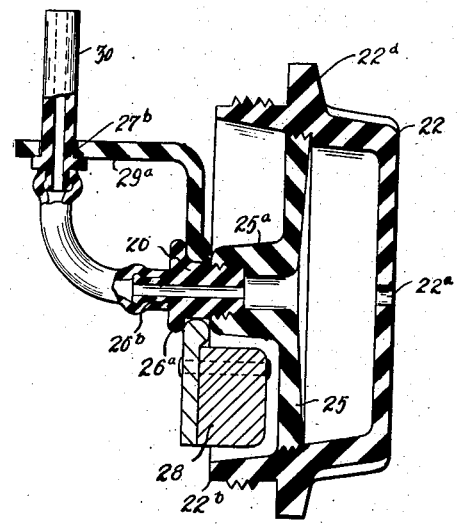
Fig. 3 is a sectional view of the improved venting means detached from the other parts of the battery.

Thus, when the battery is placed on its side, the arm swivels and turns the tube 29 so that the end of the stem will project above the electrolyte, with the result that the battery will be vented the same as when it stands in its normal upright position, and at the same time there is no loss of electrolyte. This situation prevails regardless of the side on which the battery is turned or even if it is turned from side to side, the distance between the terminal posts 13 being such that there is clearance for the stem to turn through any arc and, in fact, through one or more complete revolutions. The swivelling of the arm 27 simply twists the tube 29, and the twist in the tube is relieved by the turning of the stem in the opening 27b. Fig. 2 may be regarded as a view of the top end of the battery when the latter is on its side. In this view I have shown by dotted lines the weight 28 in its lowermost position, and the positions of the arm 27 and the tube 29 with its stem 30 when the battery is in a horizontal position, and in this figure I have shown by dot and dash lines how the stem is capable of swinging in the manner explained above so that the stem will extend upwardly with its end above the electrolyte when the battery is in a horizontal position.

The construction herein illustrated has proved to be very effective for the attainment of the objects stated at the beginning of the specification. However, I do not desire to be confined to the precise details shown as changes may be made in the venting arrangement without departing from the spirit of the invention. Likewise, many details of the battery can be modified without in the least changing the effectiveness of my improved venting means including the flexible swivelly arranged tube which prevents loss of the electrolyte and is effective for venting purposes even though the battery is turned on its side. For example, it is not essential that a separate filler plug be employed for this may be eliminated and the filling accomplished by removing the vent plug body and the parts supported thereby. I therefore aim in my claims to cover all modifications which do not involve a departure from the spirit and scope of the invention.

Having thus described my invention, I claim:

1. A storage battery comprising a case containing positive and negative plates and electrolyte and provided with a cover, a venting member carried by the cover and provided on its lower end with a laterally extending vent tube, and a counterweighted member swivelled on the lower end of the venting member to turn around the axis thereof and having means for turning the tube so that it will extend upwardly when the battery is turned on any of its sides, the free end of the vent tube being above the normal electrolyte level when the battery is in upright position and being above the electrolyte level when the battery is on its side.

2. A storage battery comprising a case containing positive and negative plates and electrolyte and provided with a cover, a venting member carried by the cover and provided on its lower side with a flexible tube having a laterally projecting end and gravity actuated counterweighted means for causing the tube to swing automatically into an upwardly extending position when the battery is turned on its side, the free end of the tube being above the normal electrolyte level when the battery is in upright position and being above the electrolyte level when the battery is on its side.

3. A storage battery comprising a case containing positive and negative plates and electrolyte and provided with a cover, a venting member carried by the cover and provided on its lower side with a flexible tube with a laterally projecting end, and a rotatable counterweighted member for turning the free end of the tube so it will stand in an upwardly directed position when the battery is turned on its side, said laterally projecting end of the tube being above the normal electrolyte level when the battery is in upright position and being above the electrolyte level when the battery is on its side.

4. A storage battery comprising a case containing positive and negative plates and electrolyte, a cover provided with a vent plug body having a hollow reduced extension on its lower side, a counterweighted arm supported on said reduced extension for rotation around the extension and having a depending portion, and a flexible tube fixedly connected to said reduced extension and having a stem projecting laterally through said depending portion whereby when the battery is turned on its side said arm will swivel and turn said stem upwardly, the stem being above the normal electrolyte level when the battery is in upright position and being above the electrolyte level when the battery is on its side.

STEWART C. AIKENHEAD.